United States Patent [19]

Goldberg

[11] 3,806,665

[45] Apr. 23, 1974

[54] HOLD CONDITION INDICATING REMINDER

[76] Inventor: Alan Goldberg, 688 Boulevard, New Milford, N.J. 07646

[22] Filed: Jan. 22, 1973

[21] Appl. No.: 325,586

[52] U.S. Cl. .................................. 179/99, 179/84 L

[51] Int. Cl. .......................................... H04m 1/00

[58] Field of Search ........... 179/1 MN, 2 TC, 6.3 R, 179/6.31, 18 BG, 27 FD, 18 AB, 27 FC, 175.2 C, 175.2 R, 175, 84, 99

[56] References Cited

UNITED STATES PATENTS 3,629,514 12/1971 Flamini, Jr. ........................... 179/99

3,742,151 6/1973 Ruether ................................. 179/99

FOREIGN PATENTS OR APPLICATIONS 998,475 9/1951 France ............................ 179/1 MN

*Primary Examiner*—Kathleen H. Claffy

*Assistant Examiner*—Gerald Brigance

*Attorney, Agent, or Firm*—Ralph R. Roberts

[57] ABSTRACT

This invention relates to an apparatus and method for monitoring a telephone line and particularly to multi-line equipment where a calling party or line may be placed on "hold" for a period of time. This condition indicating reminder automatically starts measuring the accumulating time interval of each hold signal and at a preselected period of elapsed time causes a visual and/or audible signal to be actuated. This monitoring equipment in one embodiment is shown arranged for the normal five lines usually available on a push button set but may be for any number of phone lines of more than one and having a hold arrangement for a line. In an alternate embodiment particularly for phone apparatus having no hold buttons or a switchboard equipment where the hold is achieved by a switch means which does not cause a voltage change on the "R" and "T" lines, this alternate reminder apparatus and method monitors a connected line for audio signals and in the absence of such signals after a short time delay initiates the starting of an elapsed time clock and and associated apparatus.

18 Claims, 2 Drawing Figures

HOLD CONDITION INDICATING REMINDER

BACKGROUND OF THE INVENTION

1. Field of the Invention

With reference to the classification of art as established in the U.S. Patent Office this invention is believed to pertain to the general class entitled, "Telephony" and more particularly to the subclass entitled, "systems" and more particularly to the subclass thereunder of "check controlled-time."

2. Description of the Prior Art

The field of telephone systems is vast and the patents pertaining to the equipment, switchboards, record operations and the associated equipment is quite extensive. Among the equipment disclosed in these patents and in wide use is the multiline equipment among which are those having handsets with a push button selection of from two to five lines. To enable the party being called to defer his or her answering a particular call while other calls are in progress or are coming in or going out, the push button handset is provided with a hold system enabling the user of the handset to switch to other lines without disconnecting the hold call. In the more modern larger switchboards used by companies requiring more phones and employing one or more operators, a similar system is utilized to provide flexibility and efficiency. In these larger boards hold facilities are also provided for the several lines. When the handset or switchboard is busy or because of inattention it frequently occurs that the hold period, at least for the party on the line, extends for uncomfortably long times.

In single line phone systems having no hold button means and in the older larger switchboards where hold indicating facilities are absent this invention provides alternate apparatus and method in which are provided means for ascertaining the hold by analyzing the audio condition and when audio inactivity is ascertained this condition is indicated by a timed reminder signal.

SUMMARY OF THE INVENTION

The hold condition indicating reminder of this invention is used in conjunction with the telephone to indicate when a party has been placed on hold for a period of time such as longer than a minute. This reminder apparatus is shown in two circuits and in each circuit measures this time interval and when this interval is reached causes an indicator lamp to light and/or an audible tone to be generated. This reminder signal or signals indicates that this line has been in a hold condition for longer than the prescribed time period. The termination of the hold in either circuit causes a reset of the time which then remains in an arrested state until a new hold starts the timer to monitor this new hold condition. This condition indicating reminder prevents the hold calls from accidentally exceeding a determined time period such as one minute. The audible and visual signal when made may be used to call to the attention of a supervisor or office manager the hold activity of the system. Any hold signal when terminated, even momentarily, causes the time period to be reset with this established time period being merely a matter of selection.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific circuit and method for the condition indicating remainder employing a voltage reading of a hold condition on one or more phone lines as adopted for use with a multiline push button handset and showing a preferred reminder circuit. In an alternate embodiment the circuit of the indicating reminder utilizes audio information for actuating the reminder. This specific circuit and the alternate circuit has been chosen for the purposes of illustration and description as shown in the accompanying drawings wherein:

TERMINOLOGY

Figure 1:
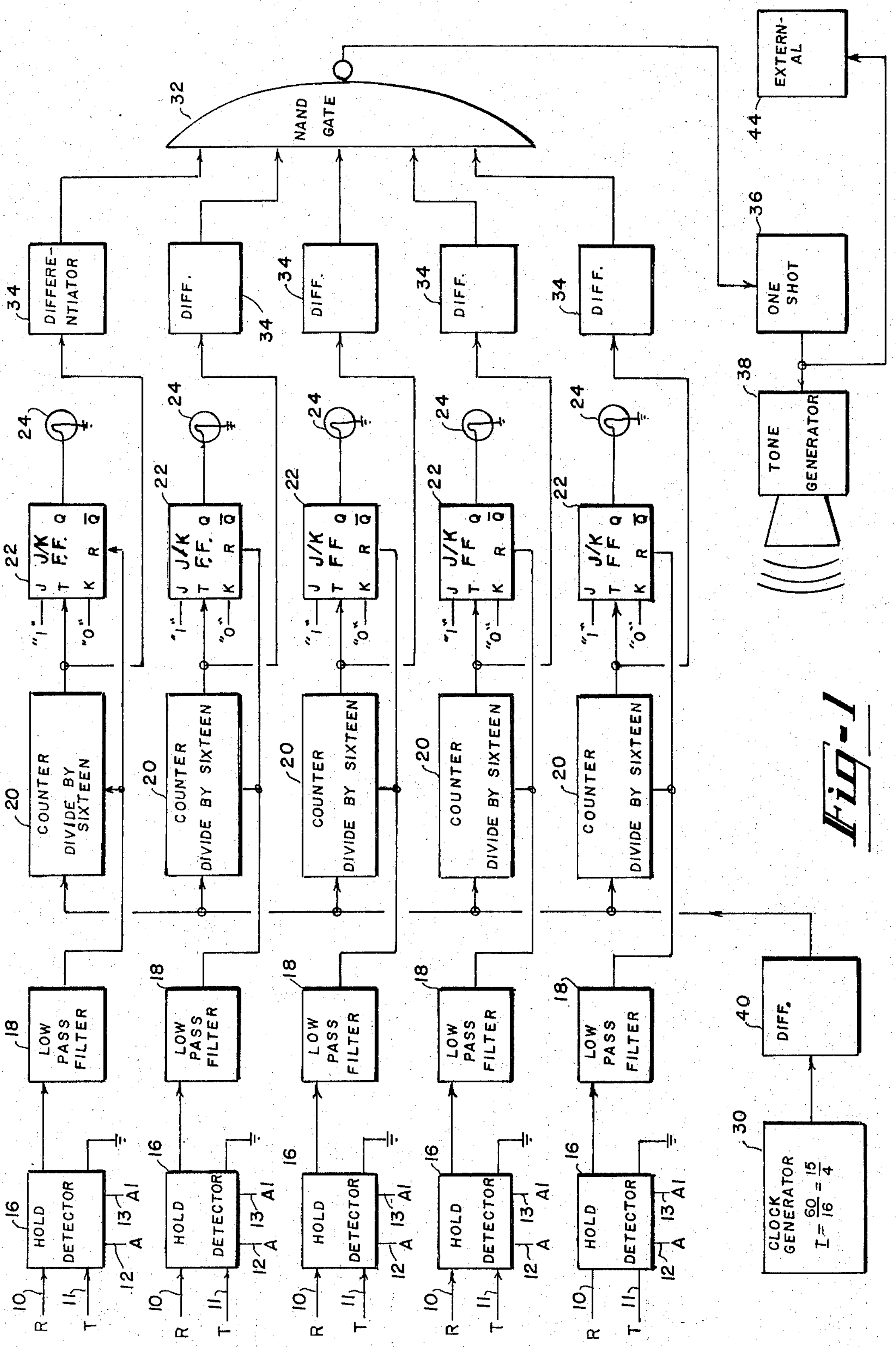
FIG. 1 represents a schematic diagram of a preferred circuit of a hold condition indicating reminder for multiline use in which the voltage across the R and T phone lines is analyzed for a hold condition of the line.

In the description of the preferred circuit and an alternate thereof the circuits employ known electrical elements. These circuits, as illustrated, are used with telephone service normally available in the United States. In the description the terms used include the following:

Line is applied to a telephone line in which there are two incoming wires called "ring" (R) and "tip" (T) by the telephone company. These wires carry the audio information and are used for determining whether a hold condition exists.

Pickup Circuit - this circuit includes the two incoming wires which feed and control the telephone equipment. This equipment is usually located locally in the office or the place of business where this equipment is installed. These two wires are identified by the telephone company as A and A-1. The A and A-1 lines are also used in conjunction with lines identified as R and T lines for indicating a hold condition of the line.

Hold Detector - the hold detector receives and uses information present on the R and T line and the A and A-1 wires for the incoming line and the pickup circuit. When there is a voltage present across the A and A-1 lines and a voltage less than ten volts across the R and T lines, a hold condition is present. A hold condition is created when that particular line has been picked up and through use of the push buttons on the telephone set of a hold switch on the switchboard causes this line to be placed in a hold condition. When the audio information is analyzed in the absence of a hold voltage on the A and A-1 lines the detector reads and analyzes the absence of audio signals on the R and T line.

Low-Pass Filter - a device for inhibiting the passage of high frequency transients. These transients may indicate false readings or falsely reset the counter in the hold condition indicating reminder. The time constant of the low-pass filter used in this unit is approximately 1 millisecond.

Divide-by-16 - a circuit used in this indicating reminder circuit and includes a chain of four binary flip-flops. These flip-flops are so connected that sixteen incoming pulses are accumulated before one outgoing pulse is made. Therefore, the total number of input pulses is 16 times the total number of output pulses.

"J"-"K" Flip-flop - The type of J-K flip-flop used in the illustrated reminder circuit is a device which has four inputs and two outputs. The outputs are identified as "Q" and a "Q-bar". The Q-bar output is the complement of the Q outlet. When the Q is in logic 1 state, the Q-bar is in the logic zero state and vice versa. One of the inputs to this flip-flop is a reset input. Whenever this reset input is held to ground or held to logic zero, the output will assume Q equal to logic zero and Q-bar equal to logic 1. This condition will exist independently of any other input. The main three inputs are those identified as J, T and K. The T input receives the clock pulse. When the J is in logic 1 and the K is in logic zero, then upon receiving a clock pulse the J-K flip-flop moves to the opposite state. Q becomes logic 1 and Q-bar becomes logic zero regardless of any other previous conditions providing the reset input is no longer held at logic zero. While the reset remains at zero any further pulses on the T will have no effect since the only way to flip the states of the flip-flop is to ground or bring to logic zero the R input or reset input. When both the J and K inputs are held at logic 1 a clocking signal is placed at the input T, then a J-K flip-flop will cycle back and forth at a rate equal to one-half the input signal.

Lamp - is an indicating device such as a light bulb and a driver which causes the lamp to light when a signal is placed on it.

Differentiator as used in this hold minder is not the classical differentiator but is a digital differentiator which is a device that forms a narrow pulse out of a wide pulse or a level shift. Therefore, any positive level shift or any positive pulse fed into the digital differentiator produces a very narrow, approximately one microsecond, negative going pulse.

Tone Generator - a device when a signal is placed upon it generates an audio tone.

NAND-gate - is a gate as used in this device which receives negative going signals and produces a positive going output. Any inputs into the NAND-gate which are negative cause the output which is normally at a logic zero to go to a logic one.

One-shot - an electrical device which upon receipt of a pulse produces a fixed output pulse. The output pulse of the one-shot used in this indicating reminder is nominally one-half second. The output pulse is used to drive the tone generator for approximately one-half second.

External Output - the external output is an output jack and a driver which allows information generated in the hold indicating reminder to be used at a remote selected location.

Clock Generator - in the circuit of this indicating reminder is a device which generates a series of clock pulses. The period of the clock pulses in a 1 minute hold time limit as proposed is approximately fifteen-fourths of a second. Fifteen-fourths of a second has been selected because fifteen-fourths times 16 gives exactly sixty seconds.

DESCRIPTION OF THE CIRCUIT AND OPERATION OF THE INDICATING REMINDER OF FIG. 1

In the following description and in the claims various details will be identified by specific names for convenience. These names, such as in the terminology above defined, are intended to be generic in their application. Corresponding reference characters refer to like members throughout the two illustrated circuits of the drawings.

The drawings accompanying, and forming part of, this specification disclose certain details of the circuits for the purpose of explanation of the broader aspects of the invention, but it should be understood that details may be modified without departure from the concept and principles of the invention.

The hold condition indicating reminder shown in the circuit diagram of FIG. 1 is arranged for five individual channels which correspond to the five lines normally available on a telephone push button set. Each line consists of four wires identified as 10, 11, 12 and 13 and corresponding to R, T, A and A-1. Each channel includes a hold detector 16, a low-pass filter 18, a divide-by-16 counter 20, J-K flip-flop 22 and a lamp indicator 24. All channels share the same clock circuitry and the same tone generation circuitry. In the absence of a hold condition on any channel the hold condition detector 16 of that channel forces the divide-by-16 counter 20 and the J-K flip-flop 22 into a reset state. Any clock pulses received during a reset state will not cause these devices to count or change states. The placing of a hold condition on any channel is detected by the hold condition detector 16 on that line. This removes the reset state or condition and clock pulses from a generator 30 are allowed to enter the divide-by-16 counter 20 and also the J-K flip-flop 22 of that line. The divide-by-16 counter 20 and the J-K flip-flop 22 respond to clock pulses because they are no longer forced into the reset condition.

Before signals pass from the hold detector 16 to the divide-by-16 counter 20 and the J-K flip-flop 22 they pass through a low-pass filter 18 whose purpose is to remove transient signals from the hold detector 16. These transient signals are filtered since they might cause a false resetting of the J-K flip-flop 22 and the divide-by-16 counter 20 in the middle of a cycle. These transient signals which are removed by the low-pass filter might occur through power line surges in the building where the condition indicating reminder is located or radio frequency interferences might provide such signals, or signals might also be caused by any one of a number of conditions which may exist on either the R and T input lines 10 and 11 or the A and A-1 input lines 12 and 13.

When a hold condition exists and is detected the reset is removed from the J-K flip-flop 22 and the clock pulses from generator 30 are then allowed to enter the divide-by-16 counter 20. If this hold condition is not removed before the predetermined time interval such as one minute has been reached, the divide-by-16 counter produces an output pulse. This output pulse triggers the J-K flip-flop 22 which then assumes a state of Q equals logic 1. When Q equals logic 1, an output signal is sent to the lamp circuit causing the lamp indicator 24 to be illuminated. This illumination indicates visually to the observer that this particular channel has been and is in a hold state for a period greater than the selected period such as 60 seconds. Any further clock inputs to the J-K flip-flop 22, that is into the T input of the J-K flip-flop 22, has no effect since the J input of the J-K flip-flop 22 is at logic 1 and the K input is held at logic zero. The J-K flip-flop remains in a Q equals logic 1 condition until it is reset by a signal from the hold detector 16 on the counter 20.

When the hold condition on the line is removed then the J-K flip-flop 22 and the divide-by-16 counter 20 are forced into a reset condition and the indicator lamp 24 is extinguished. From the foregoing description it is noted that where the only indication of an excessive hold time required is an illuminated lamp, then the combination of hold detector 16, low-pass filter 18, divide-by-16 counter 20. J-K flip-flop 22 and lamp indicator 24 is sufficient for each incoming line. Therefore, if a telephone system was to have more than the five illustrated lines such as 100 lines and it was desired to monitor all hundred lines than 100 assemblies of these components would be required. In other words, one assembly is needed for every line. However, it may happen that a visual indication that an excessive hold condition exists might not be visually noted. Where this might occur, this condition indicating reminder is contemplated to also provide an audio signal that there is a hold condition which has exceeded the determined measurement of time. This audio signal also is actuated when the initial illuminated signal is made and indicates that there is an extended hold condition on a line.

Where there is a hold condition existing longer than 60 seconds on any one of the lines monitored (for example five lines) by this hold indicating reminder the signal from the J-K flip-flop is fed to a NAND-gate 32 to initiate an audio tone. Where the lamp is illuminated and remains illuminated until the hold is terminated it is contemplated that an audio tone be generated at intervals of 1 minute while the hold condition exists. For example, if one line has a hold condition present for a period of 6 minutes, after the first minute period the lamp is illuminated and remains so for the next 5 minutes. At the first and each succeeding minute short, discreet and separate audio tones are generated. To accomplish this sequence of tone signals the output of each divide-by-16 counter 20 is fed into a differentiator 34 as well as the J-K flip-flop 22. This differentiator 34 produces a narrow negative going pulse which is then fed into a common gate or a multiple input NAND-gate 32. Whenever there is a negative going input signal or pulse into this NAND-gate there is a positive going output signal or pulse. This output signal is used to trigger a one-shot 36 which receives the narrow pulse which comes from the NAND-gate and stretches it and makes it wide. For example, to approximately one-half second. This pulse drives a tone generator 38 and produces a tone for approximately this one-half second.

Every time there is an output pulse from one of the divide-by-16 counters 20 there will be a one-half second tone signal. The outputs from all the divide-by-16 counters 20 are fed into differentiators 34 and then into the inputs of the NAND-gate 32. Any one of the divide-by-16 counters 20 producing an output signal will produce a tone signal. If two output signals occur within one-half second of one another only one tone signal is produced, but as long as the outputs occur one-half second or greater from one another there is a tone signal each time there is an output pulse from any one of the divide-by-16 counters 20. A great number of audible tones will indicate to the monitor operator or supervisor that several lines are in a hold condition for a period of more than 1 minute and some attention to this condition is indicated.

The clock circuitry of this hold minder uses an oscillator 30 which produces pulses at a rate of fifteen-fourths of a second. These pulses are fed into a differentiator 40. This differentiator 40 is designed to produce very narrow clock pulses which reduce the possibility of an error caused by removing the reset command at the middle of a clock pulse. The only error present is the nominal one-count gating error which is common in all usual forms of digital gating of a clock pulse. This error arises when the reset is removed just after a clock pulse has appeared, resulting in the time lost being almost one complete clock period. When one clock pulse has been accumulated in the counter the removal of the reset and prior accumulated time make the total time closer to two clock pulses that should have been accumulated and, therefore, arises the one-count gating error, or about 1 second. However, this error is not to be confused with an error by gating while a clock pulse is present and for this reason the clock pulse is differentiated.

This narrow clock pulse is then fed by a common conductor 42 to all the divide-by-16 counters 20. When and if a hundred channel circuit is constructed the same clock pulse is designed and adapted to drive a hundred counters 20 simultaneously. A hundred channel system, if constructed, would also require a hundred input NAND-gate so that all the outputs from the divide-by-sixteen counters could be summed up to produce the same single audio tone from tone generator 38.

An external output 44 is also contemplated. This output, when used, may be employed to drive a remote counter lamp system or a remote tone generator. This station and desired signals are usually located at some supervisory position. The remote output is driven from the half-second one-shot 36. This one-shot which produces an output whenever it receives an input pulse from the NAND-gate 32 may, if desired, also be used to drive a counter, not shown, which would indicate the number of times a tone has been generated. This information is often useful in determining how many minutes a hold condition has been present with the number displayed on the counter indicating the total number of minutes in which a hold condition has been present.

DESCRIPTION OF ALTERNATE CIRCUIT OF FIG. 2

The hold detector 16 of the circuit above-described in conjunction with FIG. 1 utilizes the R and T input lines 10 and 11 and the A and A-1 input lines 12 and 13 and by analyzing the voltage of these lines determines whether a hold condition exists or not. However, this is only one form of a hold detector. It is also contemplated that an alternate form of a hold detector 116 is one which monitors the audio signal present on the line, that is the R and T lines 110 and 111 and if there is a D C voltage of less than 10 volts on these R and T lines 110 and 111 and no audio signal is present for a nominal fixed period, for example, 5 to 10 seconds then a hold condition exists. Thus with this arrangement the hold condition indicating reminder may be employed where there are no push buttons on a phone set or with a switchboard arrangement where the phone on hold is provided by a remote operating switch. When phone apparatus of these types are used a hold condition can be determined by just analyzing the audio signal of the line in use. Where no audio signal is present on the line for a determined period of time, the line would be considered to be on hold providing the voltage across R 110 and T 111 indicates an off hook condition.

Figure 2:
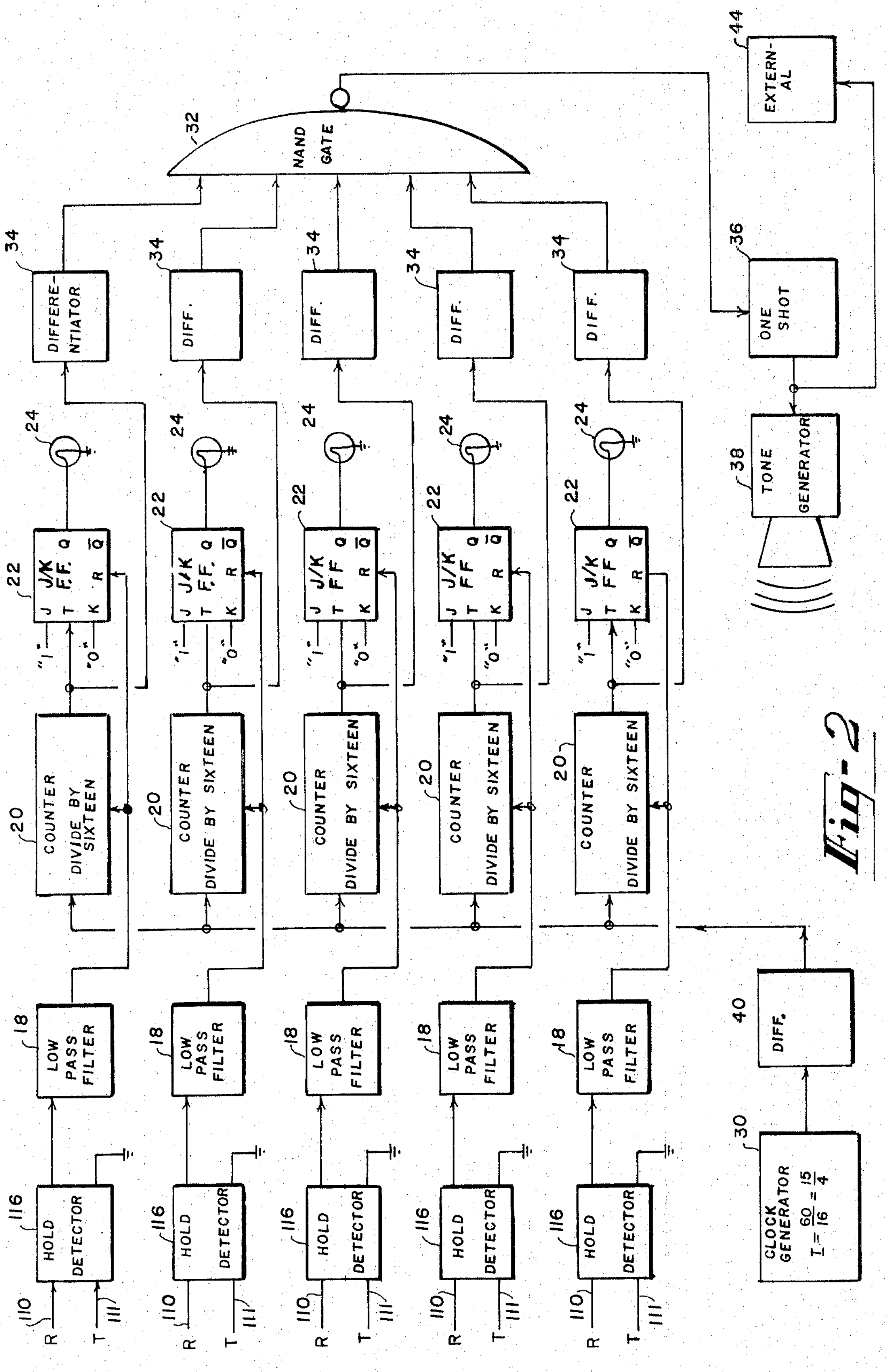
FIG. 2 represents a schematic diagram of an alternate circuit in which the hold detector indicates a hold condition if a voice is not present on a line for more than a period of time such as ten seconds and the voltage across lines R and T indicates the receiver is in an "off hook" condition.

The hold detector 116 is constructed so as to be inactive when the line is in a disconnect condition. That is, when the phone handset is hung up and the line is disconnected from the switchboard. This is so that a false signal is not made by the detector to the remaining circuit to cause a signal. As in FIG. 1, the detection by the audio detector 116 causes an audio and/or visual signal to be made at the expiration of a determined period of time such as one minute. Filter 18, counter 20, flip-flop 22, lamp 24, differentiator 34, NAND-gate 32, one-shot 36, tone generator 38, pulse generator 30, differentiator 40 are utilized in this embodiment of FIG. 2 as in and by those described in FIG. 1.

In the appended claims there is included the method of detecting a hold condition and timing the duration of this hold condition. Since electronically it is possible to provide these steps by components which are alternates to those shown, the method of accomplishing this result is claimed although these functions are necessarily performed by the exemplified apparatus and the control provided by the J-K flip-flop may be provided by other apparatus such as an adder and the like. In the broad context the method includes a hold condition of and on a telephone line so as to furnish to an observer in the form of a signal, information pertaining to the initiation of the duration of said hold condition, said steps including: connecting a hold detector to the wires of a telephone line so that said hold detector is analyzing the voltage on the line and discriminating as to when the line has been brought to a hold condition; feeding a pulse signal from the hold detector in response to a hold indicated condition, said signal being received by a pulse counter which upon receipt of the signal begins a counting of pulses provided by a pulse generator, the counting continuing for a determined period of time and when reaching this period of time initiating a foregoing pulse signal; receiving said pulse signal by a indicator means such as a lamp, audible tone generator, combinations thereof and like signal means, said indicating means responsive to the pulse signal when the counter releases this pulse to cause the indicator means to be actuated, and discontinuing the time measurement of and by the pulse counter and the resulting actuation of the indicator means when the hold condition of the phone line being detected has been terminated.

Terms such as forwardly and the like are applicable to the apparatus and circuit shown and described in conjunction with the drawings. These terms are merely for the purposes of description and do not necessarily apply to the position in which the apparatus is arranged and connected or used.

While a particular embodiment of the reminder apparatus and circuit and alternate embodiment have been shown and described it is to be understood that modifications may be made within the scope of the accompanying claims and protection is sought to the broadest extent the prior art allows.

What is claimed is:

1. A hold condition indicating reminder apparatus and circuit for monitoring a telephone line so as to detect when the line has been placed in a hold condition and to provide an observer such as a supervisor of information pertaining to the initiation and duration of said hold condition, the apparatus and circuit including:

a. a conventional telephone line carrying the incoming and outgoing signals to a handset;

b. a hold detector connected to the wires of the telephone line, said detector adapted to discriminate when the line has been brought to a hold condition and to initiate a signal pulse in response thereto;

c. a pulse counter having means for receiving a signal pulse from said detector and with this signal initiating the counting of pulses provided by a pulse generator, this counter counting for a determined period of time such as 60 seconds and at the end of such time initiating a foregoing pulse signal;

d. an indicator means such as a lamp, audible tone generator, combinations thereof and the like, said indicator means responsive to the foregoing pulse signal when the counter releases this pulse signal, and e. means for discontinuing the time measurement of and by the pulse counter and the resulting actuation of the indicator means as and when the hold condition of the telephone line has been discontinued.

2. A reminder apparatus and circuit as in claim 1 in which the hold detector analyzes the voltage of four wires of the incoming line and when the voltage across the two wires associated with a hold signal on the line reaches the determined voltage corresponding to the hold signal the hold detector sends the foregoing pulse to the pulse counter.

3. A reminder apparatus and circuit as in claim 1 in which the hold detector evaluates the voltage on two wires of the incoming line to determine when the handset of the connected line is in an off hook condition and an audible signal is absent from the line for a determined period of time such as ten seconds and the like and at the end of this time period the detector initiates and sends the foregoing pulse to the counter.

4. A reminder apparatus and circuit as in claim 1 in which the foregoing pulse from the hold detector to the pulse counter is passed through a low-pass filter so as to remove unwanted transient signals from the hold detector.

5. A reminder apparatus and circuit as in claim 1 in which the pulse generator is adjusted to provide one pulse every fifteen-fourths of a second and the counter when actuated has a divide-by-16 circuit which requires 16 of the generator pulses to give one output pulse which thus occurs about every 60 seconds.

6. A reminder apparatus and circuit as in claim 1 in which the means for discontinuing the time measurement includes a J-K flip-flop having means for producing a reset output pulse which is made in response to a voltage change and resulting signal from the detector, said reset pulse being fed to the pulse counter which in response to this reset pulse from the flip-flop discontinues the actuation of the pulse counter and resets the counter to a start condition.

7. A reminder apparatus and circuit as in claim 6 in which the lamp is illuminated in response to an output pulse from the flip-flop, the lamp remaining in illuminating condition until the flip-flop is shifted to a reset condition by a voltage change in a hold detector.

8. A reminder apparatus and circuit as in claim 6 in which the foregoing output pulse from the pulse counter is fed to a tone generator which then produces a short duration tone which is repeated about every minute during the time period the pulse counter is counting.

9. A reminder apparatus and circuit as in claim 8 in which one tone generator is adapted to receive the output pulse of a plurality of pulse counters each of which is connected to its own phone line, said output pulses being fed to a gate permitting the received output pulses to be further fed only to the tone generator and to the exclusion of the other feedback to connected phone line circuits.

10. A reminder apparatus and circuit as in claim 8 in which the pulse to the tone generator is first fed through a one-shot device by which the duration of the actuation of the tone generation is restricted to a determined short duration.

11. A reminder apparatus and circuit as in claim 8 in which the foregoing signal from the pulse counter to the gate is fed to and through a differentiator which passes only a pulse of a determined width so as to eliminate all signals but the pulse designating the pulse to actuate the tone generator.

12. A reminder apparatus and circuit as in claim 1 in which the pulse generator producing the pulses fed to the pulse counter feeds these pulses through a differentiator which limits the pulses to only the desired pulse forms.

13. Method of detecting a hold condition of and on a telephone line so as to furnish to an observer in the form of a signal, information pertaining to the initation of and duration of said hold condition, said steps including:

a. connecting a hold detector to the wires of a telephone line so that said hold detector is analyzing the voltage on the line and discriminating as to when the line is brought to a hold condition;

b. feeding a pulse signal from the hold detector in response to a hold indicated condition, said signal being received by a pulse counter which upon receipt of the signal begins a counting of pulses provided by a pulse generator, said counting continuing for a determined period of time and when reaching this determined period of time initiating a foregoing pulse signal;

c. receiving said pulse signal by an indicator means such as a lamp, audible tone generator, combinations thereof and like signal means, said indicating means being responsive to the pulse signal when the counter releases this pulse to cause the indicator means to be actuated, and d. discontinuing the time measurement of and by the pulse counter and the resulting actuation of the indicator means when the hold condition of the phone line being detected has been terminated.

14. The method of detecting a hold condition as in claim 13 which includes arranging the hold detector so that when the line voltage indicates a receiver is off hook the lack of audible signals for a determined period such as 10 seconds will cause the detector to feed the pulse signal forward to the pulse counter.

15. The method of detecting a hold condition as in claim 13 which includes filtering by means of a low-pass filter the signal from the hold detector to the pulse counter, said filtering to remove unwanted transient signals from the hold detector.

16. The method of detecting a hold condition as in claim 13 which further includes arranging a flip-flop in the circuit so as to discontinue the time measurement when the hold is terminated and at this actuation to reset the pulse counter to a start condition.

17. The method of detecting a hold condition as in claim 13 which includes feeding a narrow pulse derived from the output of the pulse counter through a discriminator and to a one-shot control to produce a short duration tone which is repeated at the termination of every time period of the pulse counter.

18. The method of detecting a hold condition as in claim 17 which includes feeding the narrow pulse from the discriminator to a NAND-gate which is connected similarly to a plurality of hold detectors on other phone lines, the pulses fed to the gate permitting the received pulses to be fed only to the tone generator and to the exclusion of feedback to the other connected line circuits.

* * * * *